United States Patent
Pace et al.

(10) Patent No.: US 6,313,970 B1
(45) Date of Patent: Nov. 6, 2001

(54) DISK DRIVE WITH LOW PROFILE SUSPENSION ASSEMBLIES

(75) Inventors: David Ross Pace; Ken Longken Chang, both of San Jose; Ali Hosseinzadeh, Fremont; Maziar Amirkiai, Sunnyvale, all of CA (US)

(73) Assignee: Maxtor Corporation, Longmont, CO (US)

( * ) Notice: Subject to any disclaimer, the term of this patent is extended or adjusted under 35 U.S.C. 154(b) by 1300 days.

(21) Appl. No.: 08/541,656

(22) Filed: Oct. 10, 1995

Related U.S. Application Data (63) Continuation of application No. 08/198,855, filed on Feb. 18, 1994, now abandoned.

(51) Int. Cl.$^7$ .................. G11B 5/55; G11B 21/12
(52) U.S. Cl. .................... 360/244.8; 360/244.5; 360/245.2
(58) Field of Search ................... 360/106, 105, 360/104, 97.01, 97.03, 99.01, 109, 244, 244.2, 244.5, 244.8, 244.9, 245, 245.2

(56) References Cited

U.S. PATENT DOCUMENTS

| | | | |
|---|---|---|---|
| H1425 | * 4/1995 | Wolter | 360/104 |
| 4,651,243 | * 3/1987 | Daste et al. | 360/104 |
| 4,870,525 | 9/1989 | Wong et al. | 360/137 |
| 4,937,693 | * 6/1990 | Connolly et al. | 360/106 |
| 4,947,275 | * 8/1990 | Hinlein | 360/106 |
| 4,994,931 | * 2/1991 | Foote | 360/106 |
| 5,003,420 | * 3/1991 | Hinlein | 360/106 |
| 5,027,241 | 6/1991 | Hatch et al. | 360/105 |
| 5,027,242 | * 6/1991 | Nishida et al. | 360/106 |
| 5,103,359 | * 4/1992 | Marazzo | 360/108 |
| 5,172,286 | * 12/1992 | Jurgenson | 360/104 |
| 5,184,265 | * 2/1993 | Foote et al. | 360/106 |
| 5,319,512 | * 6/1994 | Grapenthin | 360/106 |
| 5,444,587 | 8/1995 | Johnson et al. . | |

FOREIGN PATENT DOCUMENTS 3-192513 * 8/1991 (JP) ..................... 360/103

* cited by examiner

*Primary Examiner*—David L. Ometz
(74) *Attorney, Agent, or Firm*—David M. Sigmond (57) ABSTRACT

A height reduced rotary voice coil actuator assembly includes an E-block defining one or more vertically aligned short tines. Fastened to each short tine are one or two elongated tine extenders. The tine extender-short tine connection occurs outside the region above and below the data storage disks. A peg-leg load beam having tabs adapted to receive wires having no protective plastic tubing is connected to each tine extender. The wires are bonded directly to the tabs and provide electrical communication between data transducer heads located on the load beam and drive electronics. A swage boss formed in the tine extender faces outwardly in the same direction as a data transducer head assembly supported by the peg-leg load beam. Each short tine is substantially coplanar with an associated data storage disk and lies beyond the outer periphery thereof. The resulting in-line rotary actuator achieves substantial vertical or Z height compaction.

3 Claims, 10 Drawing Sheets

FIG. 9

DISK DRIVE WITH LOW PROFILE SUSPENSION ASSEMBLIES

REFERENCE TO RELATED APPLICATION

This is a continuation of application Ser. No. 08/198,855, filed Feb. 18, 1994, now abandoned.

FIELD OF THE INVENTION

The present invention pertains to head suspension assemblies for miniature fixed disk drives and more specifically to low profile head suspension assemblies and the methods for manufacturing them.

BACKGROUND OF THE INVENTION

In the computer industry, there is a constant demand for products that are both smaller and have higher performance. The hard disk drive used in virtually every personal computer is one of the largest and most expensive components installed therein. Thus, disk drive manufacturers have continuously tried to decrease the size and the cost of their drives while at the same time increasing the amount of mass storage provided.

The computer industry has developed certain standard sized disk drive configurations that will fit into a given bay in their computers. These standard sizes are often referred to as a disk drive's form factor. The challenge facing disk drive manufacturers, therefore, is to fit as much storage as possible into a standard sized package. One way of solving this problem is discussed in U.S. Pat. No. 5,208,712 which is hereby incorporated herein by reference and which is assigned to the same assignee as this application. The various embodiments of the present invention improve upon the invention disclosed in U.S. Pat. No. 5,208,712 by further reducing the height of the load beam suspension assembly, thereby reducing the spacing between the disks and enabling either a reduction in the height of the drive, or the addition of disks while maintaining the same height.

SUMMARY OF THE INVENTION

A general object of the present invention is to provide a practical way to manufacture a disk drive having a height reduced head stack.

Another object of the present invention is to provide a disk drive in which tines of an E-block of a rotary actuator are substantially aligned with data storage disks, and wherein a plurality of head suspension assemblies are attached to the tines in an arrangement enabling off-disk swaging of swage bosses of the assemblies to openings defined through the tines.

Yet another object of the present invention is to provide a rotary voice coil actuator arrangement wherein a head suspension assembly may be swaged to a tine of an E-block of the actuator at an off-disk position which is in substantial registration with a longitudinal axis of the actuator assembly including the head suspension assembly, E-block and voice coil.

The above and other preferred features of the invention, including various novel details of construction and combination of parts, will now be more particularly described with reference to the accompanying drawings and pointed out in the claims. It will be understood that the particular device embodying the invention are shown by way of illustration only and not as limitations of the invention. As will be obvious to those skilled in the art, the principles and features of this invention may be employed in various and numerous embodiments without departing from the scope of the invention.

The present invention overcomes the problems and disadvantages of the prior art through a unique head suspension assembly. The head suspension assembly of the present invention extends from a tine of an E-block (having at least one tine and usually several tines). The head suspension assembly is designed such that the tines of the E-block do not have to enter the space above or beneath any of the data storage disks of the disk drive. An elongated extender is fastened to each tine and preferably a peg-leg load beam is attached to each elongated extender. Preferably, marginal tabs and a reverse flange are formed integrally along the peripheral edge portion of the load beam. A data transducer head is affixed to a gimbal at the outer end of each load beam. Head conductor wires are dressed from the heads, along the reverse flanges and bonded to each of the marginal tabs.

In one aspect of the present invention, a swage boss of the head suspension assembly for swage-attachment to an opening of the tine faces in the same direction as the head slider mounted to the gimbal at the outer end of the load beam.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 7b is a diagrammatic side plan view of the load beam depicted in FIG. 7a.

FIG. 8g is a diagrammatic bottom plan view of the head suspension assembly depicted in FIG. 8a.

DETAILED DESCRIPTION OF A PREFERRED EMBODIMENT

Figure 1:
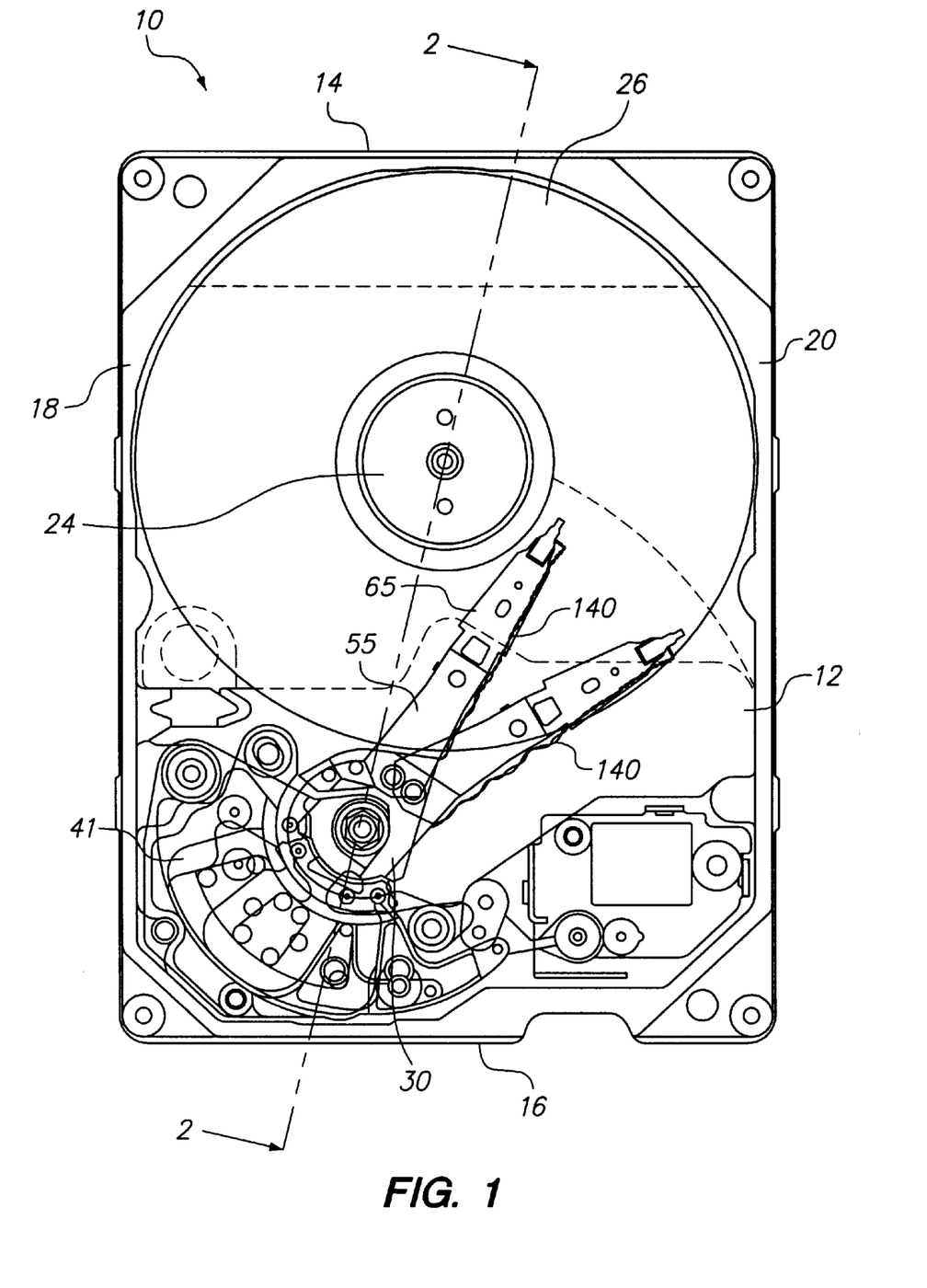
FIG. 1 is a diagrammatic top plan view of a micro-Winchester hard disk drive having a plurality of commonly journalled disks and a ganged, in-line rotary voice coil actuator structure and head suspension assembly in accordance with the principles of the present invention.
Figure 2:
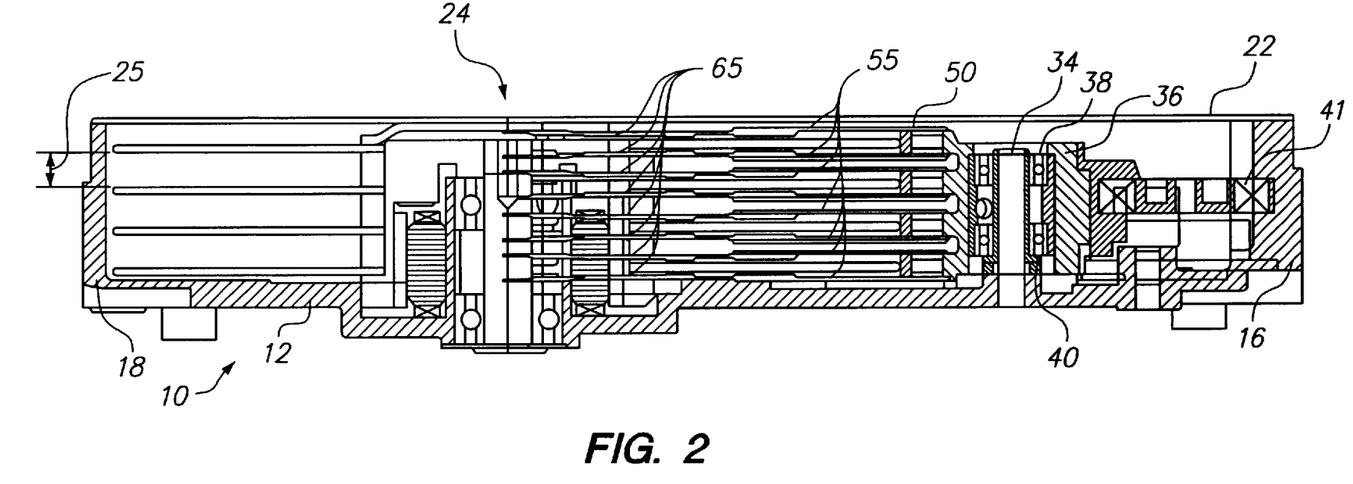
FIG. 2 is a diagrammatic view in section and side view elevation of a portion of the disk drive depicted in FIG. 1 taken along the section line 2—2 in FIG. 1.

With reference to FIGS. 1 and 2, a disk drive data storage subsystem 10 includes a base 12, typically formed of die cast aluminum alloy, having integral end walls 14, 16 and integral side walls 18 and 20. A cover 22 is secured to the base, and a gasket (not shown) between the cover and outer edge surfaces of the walls 14, 16, 18 and 20. provides an interior space protected against particulate contamination from the outside.

A rotary disk spindle assembly 24 having disks 26 mounted thereto in substantial concentric alignment is provided. Such a disk spindle assembly 24 can be constructed using conventional methods and components, examples of which are described in commonly owned U.S. Pat. Nos. 5,208,712 and 5,255,136, the disclosures thereof being incorporated herein by reference.

While the data storage disks 26 may have any suitable diameter, most preferably the disks are "submicro-Winchester" in the sense that they are 2.5 inches (65 mm), or smaller, in diameter. The disks are formed of a suitable substrate material, such as aluminum alloy, glass or ceramic. A magnetic media is deposited e.g. as a thin film by sputtering, in conventional fashion.

Figure 3:
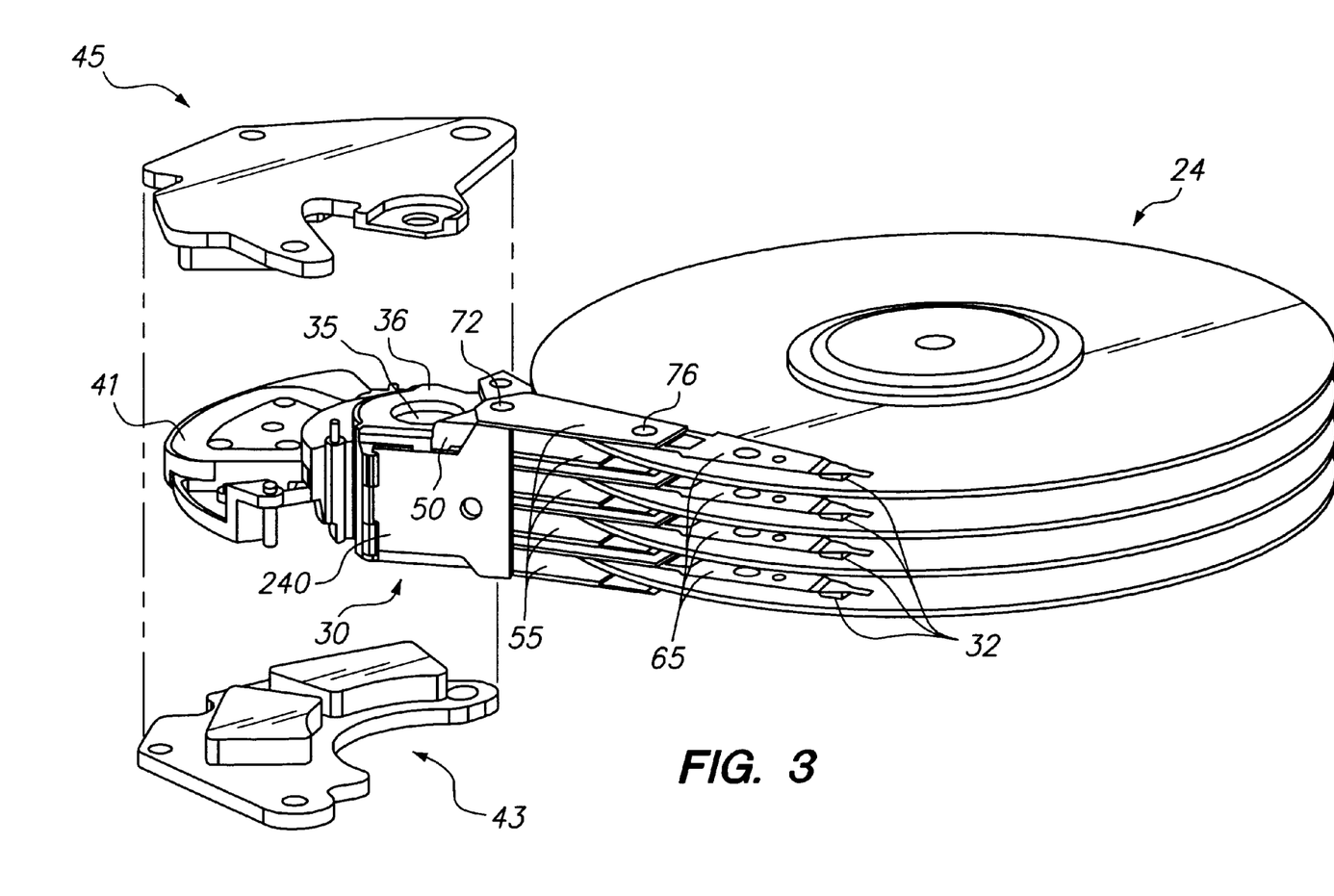
FIG. 3 is a diagrammatic view of a rotary voice coil actuator assembly and a rotary disk spindle assembly as used in a miniature micro-Winchester hard disk drive structure in accordance with the principles of the present invention, in which permanent magnet assemblies of the rotary voice coil are exploded vertically to aid illustration along the dashed explosion lines.

A particular track of a disk of the platter assembly 24 is selected by moving a reduced vertical or "Z" height rotary voice coil actuator assembly 30, as shown in FIG. 3, to a desired "cylinder" location, and selecting a particular data transducer head 32 corresponding to a desired disk storage surface containing the desired track. By "cylinder" is meant all of the tracks adjacent to the heads of the head stack at each discrete position reached by the rotary actuator structure. The term "head" is sometimes used herein to include both the electromagnetic head winding and the slider structure which incorporates the head winding and which "flies" on an air bearing adjacent the rotating disk surface in accordance with Winchester disk technology.

As shown in FIG. 2, a rotary voice coil actuator assembly 30 incorporating principles of the present invention includes a shaft 34 installed into an opening in the base 12. An E-block 36 having an opening 35 is rotatably mounted about the shaft 34 by an upper bearing 38 and a lower bearing 40. The E-block 36 is preferably constructed of aluminum alloy. A voice coil 41 formed of insulated and coiled copper wire is preferably molded as an integral part of the E-block 36. The voice coil 41 is disposed between two permanent magnet sets: a lower magnet and plate assembly 43, and an upper magnet and plate assembly 45. These assemblies 43 and 45 are shown in exploded view in FIG. 3. In practice, the voice coil 41 is placed in a magnetic flux gap defined between the closely spaced assemblies, in conventional fashion.

Figure 4A:
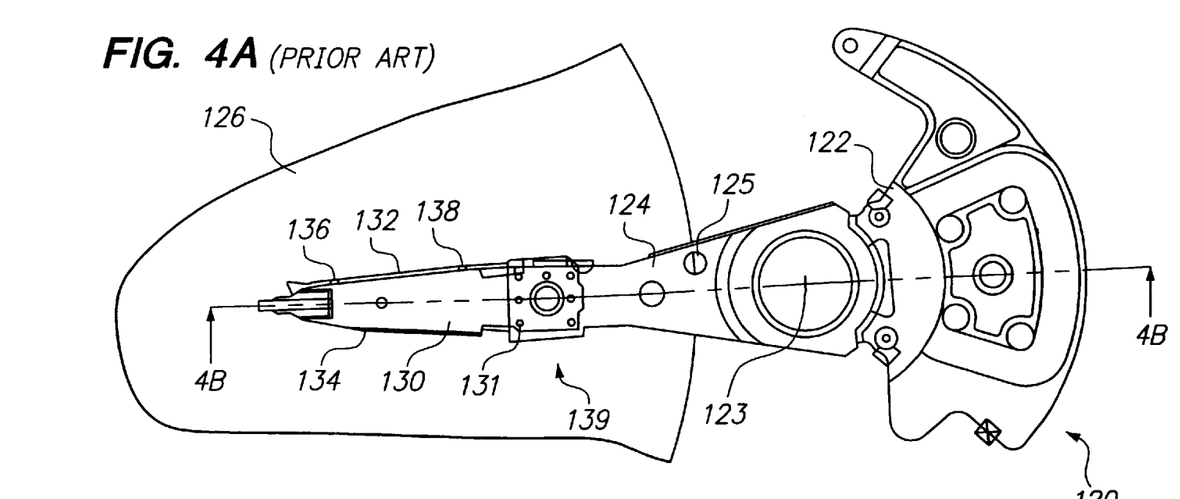
FIG. 4a is a diagrammatic top plan view of a prior art rotary voice coil actuator assembly.
Figure 4B:
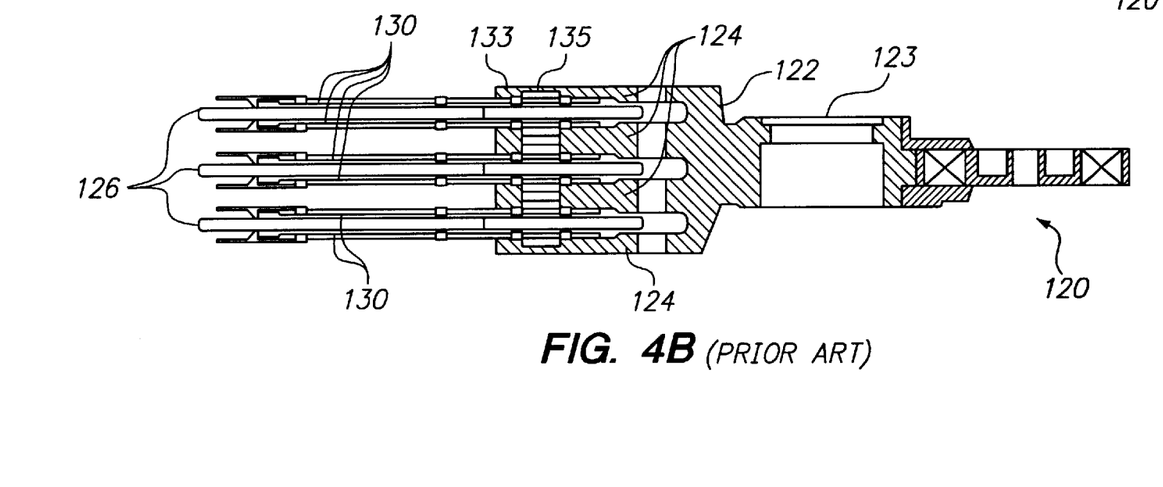
FIG. 4b is a diagrammatic view in section and side view elevation of a portion of the prior art rotary voice coil actuator assembly depicted in FIG. 4a taken along the section line 4b—4b.

In order to better understand the reduction in disk spacing achieved by the rotary voice coil actuator assembly 30, a discussion of prior art actuator assemblies, such as the actuator assembly 120 shown in FIGS. 4a and 4b is appropriate. Actuator assembly 120 has an E-block 122 defining a series of vertically aligned elongated tines 124. The prior art E-block 122 is preferably constructed of die cast aluminum alloy. The tines 124 extend into the spaces between the data storage disks 126. According to the approach of the prior art, in order to maintain the radial stiffness and resonance characteristics that are required of the actuator assembly 120 and in order to maintain manufacturability, the tines 124 must have a certain minimum thickness, depending upon the particular actuator design. Since the prior art tines 124 extended into the spaces between the disks 126, the tine thickness was a major factor in how much space was required between disks 126, which in turn was a major factor in the overall height of the assembled disk drive. Formed within the top-most elongated tine 124 is a mirror-arm opening 125. It is located slightly off-center but in front of the central shaft 123. Mirror-arm opening 125 accepts a mirror-arm fixture (not shown) used in conjunction with a laser servo writer during writing of servo patterns to the data storage surfaces of the disks. Commonly assigned U.S. Pat. No. 4,920,442 provides a description of an exemplary mirror servo writing fixture.

In addition to the elongated tines 124, prior art actuator assemblies 120 have one or two prior art load beams 130 fastened e.g. by swaging at a location over the disk 126 to each of the elongated tines 124 forming a load beam suspension member 139. By "load beam" is meant a thin flexible stainless steel plate or member to which a gimbal and the head slider is mounted and which incorporates a preload spring portion for preloading the head slider toward the disk storage surface with a predetermined gram load. This preload is overcome by an extremely thin (e.g. 2–4 micro inch) air bearing formed between the rotating data storage disk and the head slider during disk drive operations.

As described in U.S. Pat. No. 5,208,712, the prior art load beam 130 has a reinforcement swage plate 131 attached thereto by spot welds. The reinforcement swage plates 131 define swage bosses 135 which become fastened to an attachment region 133 of the elongated tine 124. When using a conventional swaging process to swage the swage boss of the prior art reinforcement swage plate 131 to the elongated tine 124, the swage boss 135 extends into an opening through the elongated tine 124 and may have a height of e.g. 0.70 millimeters, depending upon the particular design. The swage bosses 135 of inner suspension members 139 oppositely face each other and require that at least the inner tines have a sufficient thickness to accommodate the oppositely facing bosses 135. Thus, in prior art disk drives, the overall height of the prior art head stack assembly 139 disposed over and under the disks 126 requires that the disks 126 be spaced sufficiently apart to accommodate the thicknesses of the tines and load beams, usually no less than about 3.28 millimeters for example.

When compared to the prior art, the various embodiments of the present invention eliminate the elongated tines 124 and thus eliminate the need to extend the elongated tines 124 above, between or below the data storage disks 26. Instead, as will be described, tine extenders 55 are fastened by swaging to the short tine portions 50 of the E-block 36 outside the locus or periphery of the data storage disks 26. Therefore, the tine extenders 55, which may be made much thinner than the prior art elongated E-block tines 124, may be located above, between and below the disks 26 in a manner achieving a significantly reduced disk spacing.

Figure 5A:
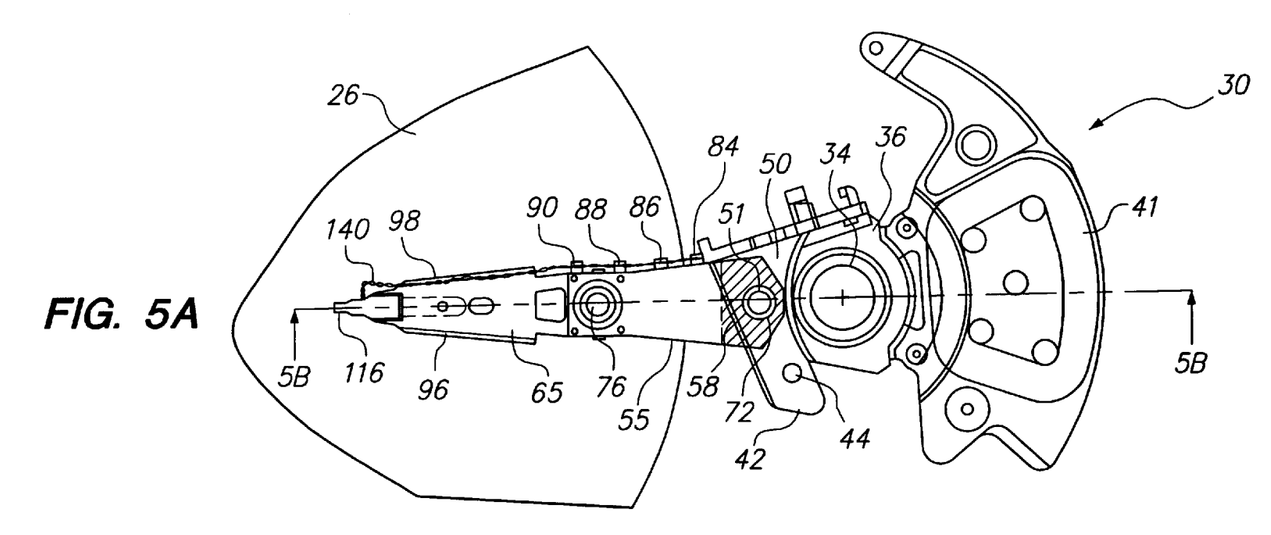
FIG. 5a is a diagrammatic top plan view of a rotary voice coil actuator assembly in accordance with the principles of the present invention.
Figure 5B:
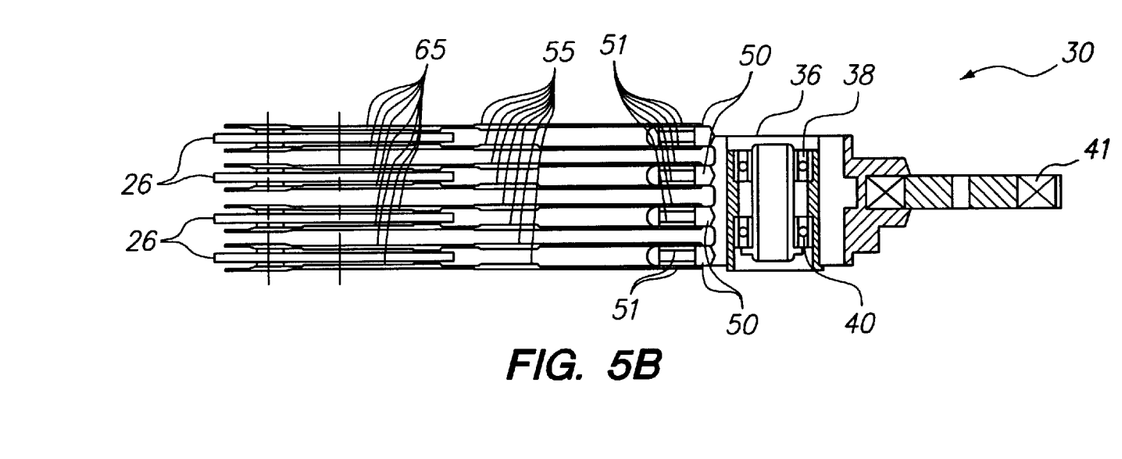
FIG. 5b is a diagrammatic view in section and side view elevation of a portion of the rotary voice coil actuator assembly depicted in FIG. 5a taken along the section line 5b—5b.

As shown in FIGS. 5a and 5b, the E-block 36 of the present invention includes a series of vertically aligned short tine portions 50. The short tines 50 each define a vertically aligned aperture 51 formed therein. One or two tine extenders 55 are secured at one end to each short tine portion 50 at an attachment region 58. The tine extenders 55 are preferably constructed of thin stainless steel sheet and preferably have a thickness of e.g. approximately 0.255 millimeters, depending upon the particular design. While the tine extenders 55 may be fastened to the short tine portion 50 of the E-block 36 in any conventional fashion, e.g., grommets, swagers, screws, epoxy bonding or welding, a special ball swaging process, which is described below in detail, is presently the preferred manner of attachment. At the outer end of each tine extender 55, a peg-leg load beam 65 is fastened thereto. Preferably, a peg-leg load beam 65 is spot welded to an associated extender 55 to form a head suspension assembly, before the tine extender 55 is mounted to its associated short tine portion 50 to form the completed head stack.

Offset from the short tines 50 and attached to the E-block 36 is an ear 42 with a threaded mirror-arm attachment opening 44 formed therein. The mirror-arm opening 44 in ear 42 is preferably placed close to the axis of rotation of the actuator assembly 30 defined by the central shaft 34. This arrangement results in the placement of the mirror-arm opening closer to the arm pivot than does forming it in the prior art elongated tine 124. When the mirror arm opening 44 is formed closer to the central shaft 34 (which anchors the E-block 36 to the base 12), a smaller moment is created by the servo-writer mirror fixture (not shown) about the central shaft 34 in both a downward direction and a radial direction. Any moment about the central shaft 36 can cause slight deflections in the actuator assembly 30, which can result in servo-pattern distortion during the servo writing process carried out during disk drive fabrication and check out. Thus, by placing the mirror-arm opening 44 closer to the central shaft 34 and reducing the moment about the central shaft, the opportunity for servo-pattern distortion is reduced.

while a servo-writer mirror fixture is one preferred manner to facilitate writing of servo patterns to the data storage disks, push pin servo writer techniques also may be employed to guide the actuator structure 30 during the servo writing operation.

Figure 6A:
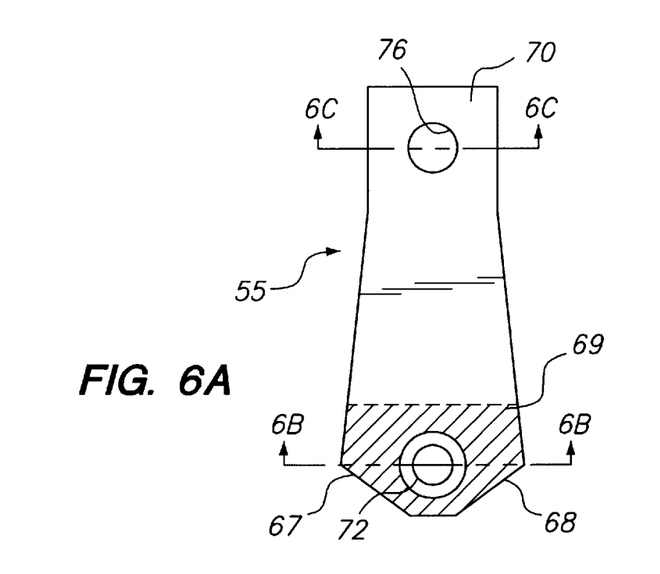
FIG. 6a is a diagrammatic top plan view of an E-block extender in accordance with the principles of the present invention.
Figures 6B, 6C:
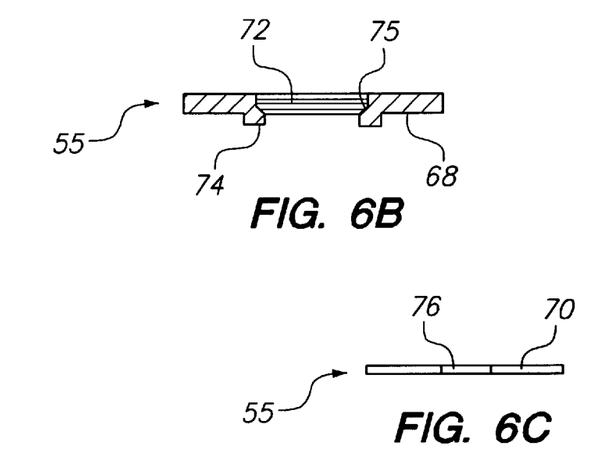
FIG. 6b is a diagrammatic view in section and side view elevation of a portion of the E-block extender depicted in FIG. 6a taken along the section line 6b—6b.
FIG. 6c is a diagrammatic view in section and side view elevation of a portion of the E-block extender depicted in FIG. 6a taken along the section line 6c—6c.

As seen in FIGS. 6a, 6b and 6c, each tine extender 55 of the low profile actuator assembly 30 includes a first attachment region 69. A circular hole 72 is formed within the first attachment region 69. As shown in FIG. 6b, a swage boss 74 having a notch 75 is defined concentric with the circular hole 72 which facilitates the attachment of extender 55. In the present example, the swage boss 74 preferably extends approximately 0.30 millimeters below the lower major surface of the tine extender 55. Adjacent the proximal end 69 are deflected edges 67 and 68. Deflected edges are useful when assembling the load beam suspension assembly 30, as will be described below. Beyond the first attachment region 69, the tine extender 55 tapers until it reaches a second attachment region 70. The second attachment region 70 has a circular hole 76 formed therein as well.

Figure 7A:
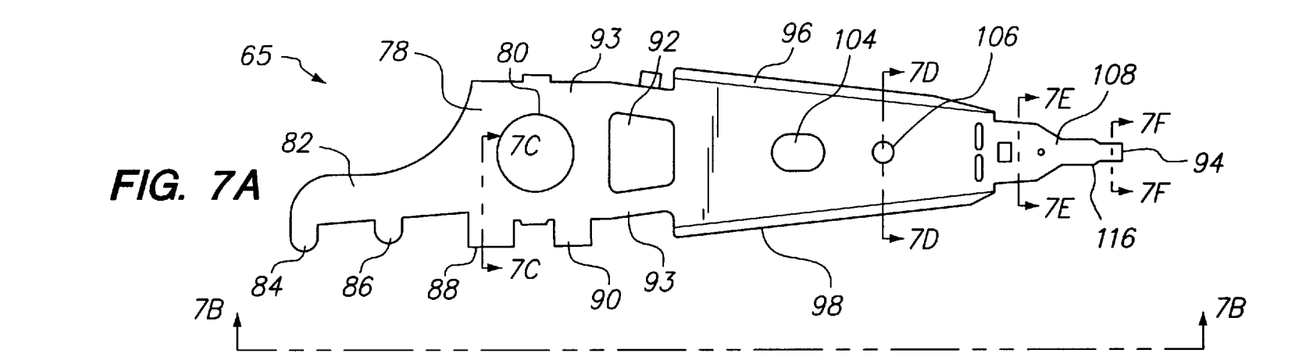
FIG. 7a is a diagrammatic top plan view of a load beam in accordance with the principles of the present invention.
Figure 7B:
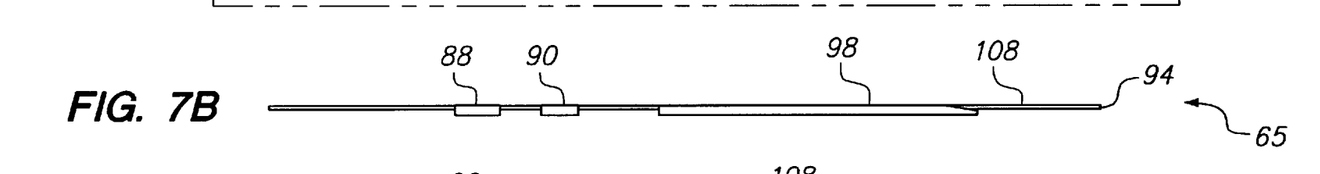
Figures 7C, 7D:
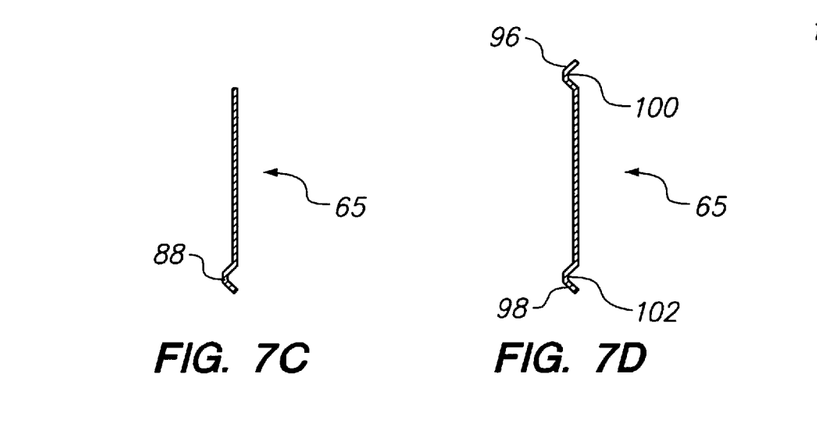
FIG. 7c is a diagrammatic view in section of a portion of the load beam depicted in FIG. 7a taken along the line 7c—7c.
FIG. 7d is a diagrammatic view in section of a portion of the load beam depicted in FIG. 7a taken along the line 7d—7d.

The so-called "peg-leg" load beam 65 is best understood with reference to FIGS. 7a–7f. Peg-leg load beam 65 is preferably constructed of thin stainless steel sheet and preferably has a thickness of 0.060 millimeters before manufacture in the present example. The peg-leg load beam 65 has a fastening portion 78 with a set-up hole 80 which is used to precisely position it underneath (it is to be understood that any use of directions, such as upwards, downwards, etc. are merely for purposes of description and not a limitation of the orientation of the assemblies) the extender 55. The fastening portion 78 has an integral peg-leg tang 82 with marginal tabs 84, 86 formed thereon. Adjacent the set-up hole 80 are head wire mounting extension tabs 88, 90. As seen in FIG. 7c, the head wire extension tabs 88, 90 have a slightly U-shaped cross-section. They preferably have a height of approximately 0.24 millimeters in the present example.

Immediately beyond the set-up hole 80, the peg-leg load beam 65 begins to taper, and defines a central opening 92 which is preferably trapezoidal in this example. The central opening 92 thereby defines two leaf spring portions 93 which provide a suitable preload bias force to an end 94 of the peg-leg load beam 65, as perhaps best illustrated in FIGS. 8b and 8c. This bias force will preferably create a preload force of e.g. 3.5 grams to urge the associated head slider 32 toward its adjacent disk surface. During disk drive operation, disk rotation creates an air bearing between the slider 32 and the disk surface which overcomes the preload force.

After the trapezoidal opening 92, ribs 96, 98 are formed along the tapered longitudinal edges of the peg-leg load beam 65. The ribs 96, 98 also have U-shaped cross-sections as shown in FIG. 7d, meaning they fold downwardly, extend outwardly, and then fold upwardly. Ribs 96, 98 thereby form channels 100, 102, as best seen in FIG. 7d and preferably have a height of e.g. 0.24 millimeters. Ribs 96, 98 serve two main purposes. Firstly, they act to stiffen the peg-leg load beam 65 in the downward and radial direction, which greatly improves the stability of the load beam suspension assembly 30. Secondly, the ribs 96, 98 enable the head connection wire pairs or sets 140 to be carried from a preamplifier circuit (not shown) to the head 32 via channels 100, 102. The wires 140 and their attachment to the load beam suspension assembly 30 will be described below. An example of a flexible preamplifier circuit is provided by U.S. patent application Ser. No. 08,198,871, entitled "Flexible Integrated Circuit Assemblies and Method", filed of even date and assigned to the same assignee of the invention of this present application, which is incorporated by reference herein.

Figure 7E:
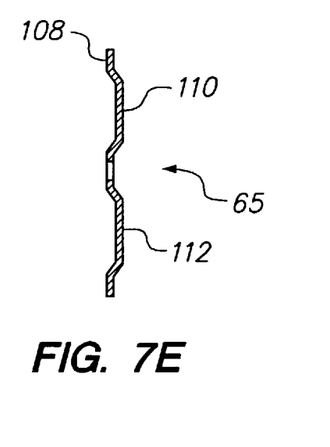
FIG. 7e is a diagrammatic view in section of a portion of the load beam depicted in FIG. 7a taken along the line 7e—7e.

Between ribs 96, 98, oval opening 104 and alignment opening 106 are formed. The purpose of alignment opening 106 will be discussed below. Immediately after the ribs 96, 98 terminate, the peg-leg load beam 65 narrows, thereby forming a head-extension 108. The head-extension 108, as seen in FIG. 7e, has two ridges 110, 112 preferably having a height of 0.136 millimeters formed thereon. These ridges 110, 112 increase the radial stiffness of the peg-leg load beam 65, thereby assuring that the head slider 32 can be easily and accurately located over the disk 26 while improving the stability of the actuator assembly 30.

Figure 7F:
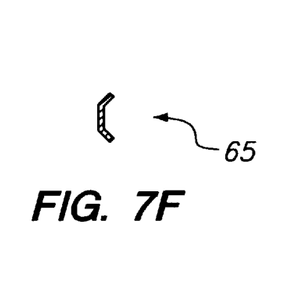
FIG. 7f is a diagrammatic view in section of a portion of the load beam depicted in FIG. 7a taken along the line 7f—7f.

After the head-extension 108, a head loading tab 116 is formed on the peg-leg load beam 65. Loading tab 116 extends just beyond the front end of the head 32 and enables dynamic loading and unloading of the head 32 from the disk 26. The cross-section of the head loading tab 116, as shown in FIG. 7f, is arc-shaped. The manner in which such a head loading tab 116 may be used is described in U.S. Pat. No. 5,208,712 which has been incorporated by reference.

Figure 8A:
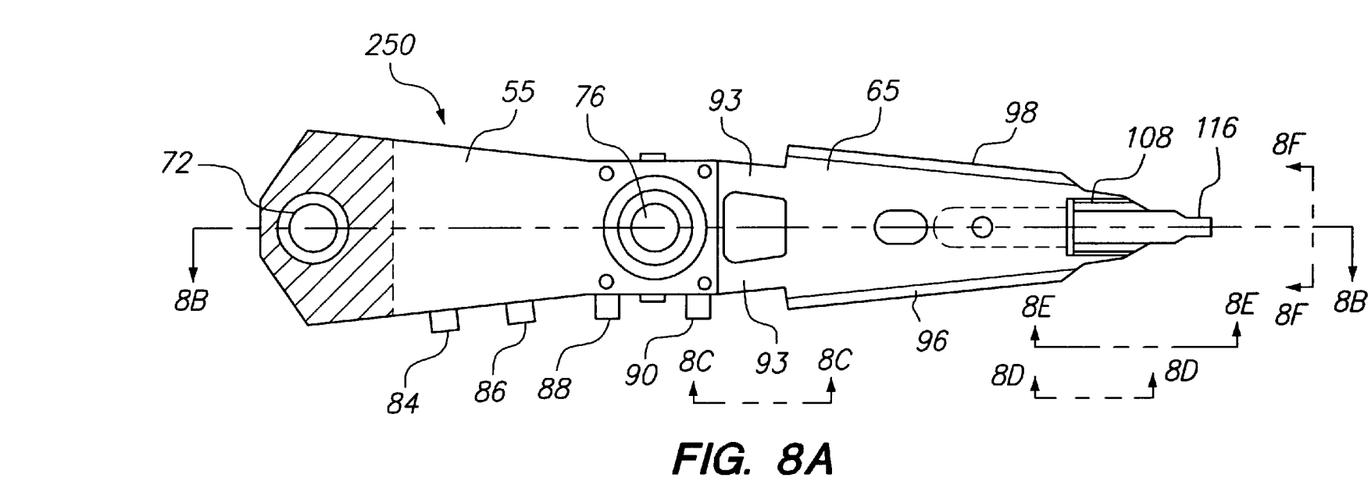
FIG. 8a is a diagrammatic top plan view of a head suspension assembly in accordance with the principles of the present invention.
Figures 8B, 8D, 8E:
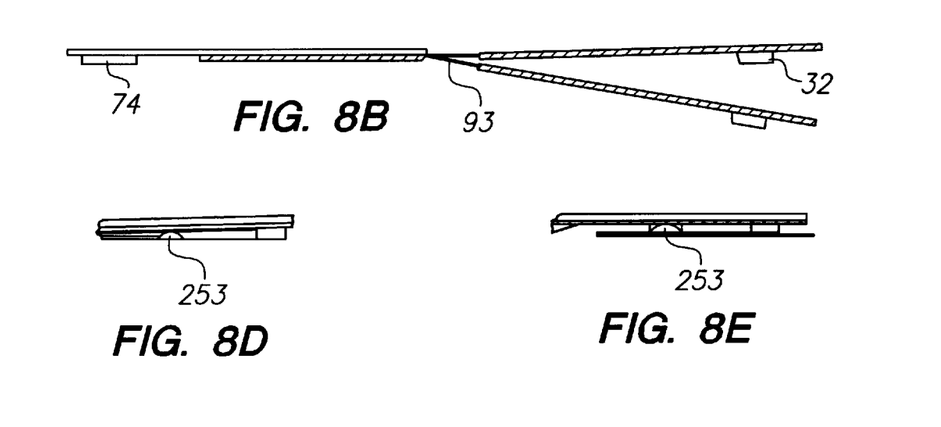
FIG. 8b is a diagrammatic view in section of the head suspension assembly depicted in FIG. 8a taken along the line 8b—8b.
FIG. 8d is a diagrammatic view in section of the head suspension assembly depicted in FIG. 8a taken along the line 8d—8d.
FIG. 8e is a diagrammatic view in section of the head suspension assembly depicted in FIG. 8a taken along the line 8e—8e.
Figures 8C, 8F:
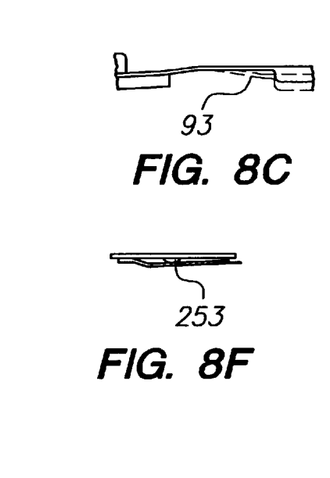
FIG. 8c is a diagrammatic view in section of the head suspension assembly depicted in FIG. 8a taken along the line 8c—8c.
FIG. 8f is a diagrammatic view in section of the head suspension assembly depicted in FIG. 8a taken along the line 8f—8f.
Figure 8G:
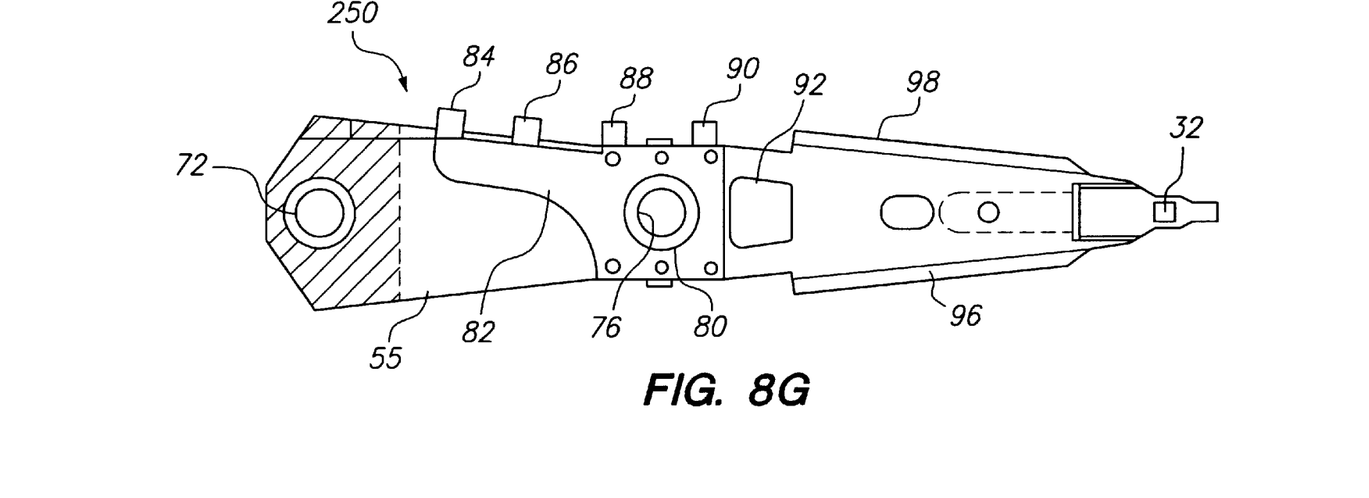

FIGS. 8a–8g depict a load beam assembly 250, which is constructed by fastening the peg-leg load beam 65 to the extender 55 and the head slider 32 to the peg-leg load beam 65 via a gimbal 253. The peg-leg load beam 65 can be fastened to the extender 55 by many different means, including bonding and preferably spot welding. As shown in FIG. 8g, an underside view of member 250, extender 55 is fastened to peg-leg load beam 65 so that circular hole 76 is concentric with set-up hole 80. This aligns the extender 55 and the peg-leg load beam 65 and causes the peg-leg tang 82 to extend beneath the extender 55 such that marginal tabs 84, 86 and wire extension tabs 88, 90 emerge from beneath the extender 55. The head 32 is attached to the gimbal 253 which in turn is formed as a part of, or is attached to, the load beam 55 using well known methods. Thus, as is clear from the above, member 250, which is the only portion of the load beam suspension assembly 30 that will be above or below a disk 26 (other than the wires 140, which are described below) has, in the present example, a height of approximately 0.54 millimeters. This low height enables the disks 26 to be stacked with a spacing of e.g. only 2.5 millimeters between them, as compared to the 3.28 millimeters typically required by prior art approaches. In a disk drive 10 containing four 65 millimeter diameter disks 26, this translates to height reduction of 2.34 millimeters.

Figure 10:
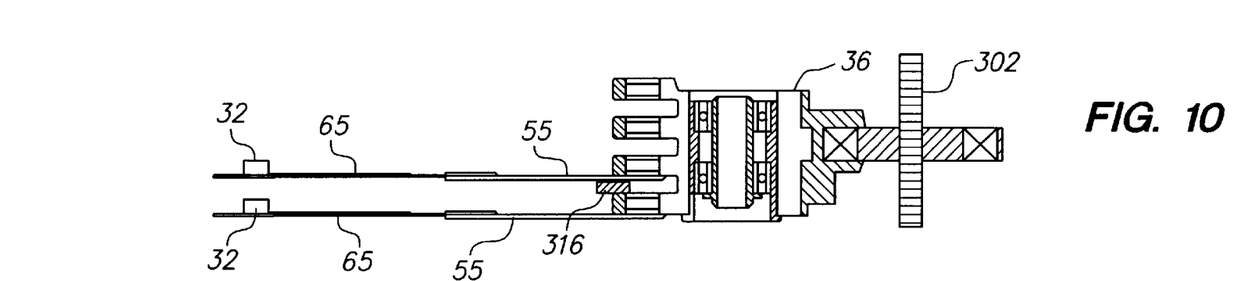
FIG. 10 is a diagrammatic view in section and side view elevation of a portion of the head stack assembly during manufacture.

As shown in FIG. 8b and in FIG. 10, one aspect of the present invention achieving overall height reduction lies in the fact that the swage boss 74 faces in the same direction as the head slider 32. This arrangement is only achievable when the E-block tines 51 are located substantially coplanar with the disks 26 and outside of the periphery of the disks, and have a thickness slightly greater than the disks 26, as perhaps best illustrated in FIG. 5b.

Each head assembly 32 includes a ceramic slider, and a thin film or metal-in-gap read/write element (or an inductive write element and a magneto resistive read element). Herein "head 32" refers to each head assembly including the slider and its associated read/write element or elements. A fifty percent slider, which is well known in the art, is preferably used in the present example in order to carry the actual data transducer head and to position it closely above its associated magnetic domain data storage surface. The information read or recorded by the heads 32 has to be communicated to electronic circuitry that processes the electrical signals. In prior art load beam suspension assemblies such as those described in U.S. Pat. No. 5,208,712, this communication was provided by small gauge twisted-wire pairs (not shown) that extended from the head to the head write driver/read preamplifier circuitry (not shown). The wire pairs or sets from each head were conventionally contained in small diameter insulator tubes typically constructed of plastic or PTFE. The tube provided mechanical protection to the very small gauge and fragile twisted wire pairs, but did so at the cost of added height, which was typically twenty thousandths of an inch. In addition to the tubes, the prior art load beam 130 included two ribs 132, 134 formed along the longitudinal edges. The tubes were placed in one of the channels formed by the ribs 132, 134. Crimping tabs 136, 138, shown in FIG. 4a, were integral to the upwardly extending portion of the ribs 132, 134 and were used to crimp around the wires tube and therefore hold the wires in the channel. However, like the tube, crimping tabs 132, 134, necessarily added height to the load beam suspension assembly.

In order to further reduce the height of the reduced height actuator assembly 30, the present invention uses tubeless insulated wires that are bonded directly to the peg-leg load beam 65. Bonding of the head wires to the peg leg load beam 65 is preferably accomplished through use of an ultraviolet-radiation cured epoxy. The wires 140 are preferably twisted pair, forty-four gauge coated insulation drawn copper wire. In addition to reducing the height of the reduced height actuator assembly 30, bonding tubeless wires 140 to the peg-leg load beam 65 facilitates a strong connection between the wires 140, the extender 55 and the load beams 65 thereby improving drive reliability.

As discussed above, the peg-leg load beam 65 has marginal tabs 84, 86, extension tabs 88, 90 and ribs 96, 98. In the present invention, wires 140, as seen in FIGS. 1 and 5a, are preferably dressed along these marginal tabs 84, 86, extension tabs 88, 90 and ribs 96, 98 of the peg-leg load beam 65. The adhesive is placed on those portions of the wire 140 on marginal tabs 84, 86 and extension tabs 88, 90, and on at least two locations on ribs 96, 98 of the peg-leg load beam 65. The wires 140 of the present invention preferably include a slightly thicker insulation than that used on the wires of the prior art.

In addition to the reduction in height of the rotary voice coil actuator assembly 30, the present invention provides for simpler manufacture which increases quality while lowering cost. The following is a presently preferred method for assembly. Prior to assembly, the short tines 50 are machined to a specified dimensional tolerance. Machining the short tines 50 helps ensure that extenders 55 are installed on a flat surface. After the short tines 50 are machined, the central opening 35 of the E-block 36 is placed over a mounting post 302 of a fixture 300, shown in FIG. 9.

Figure 9:
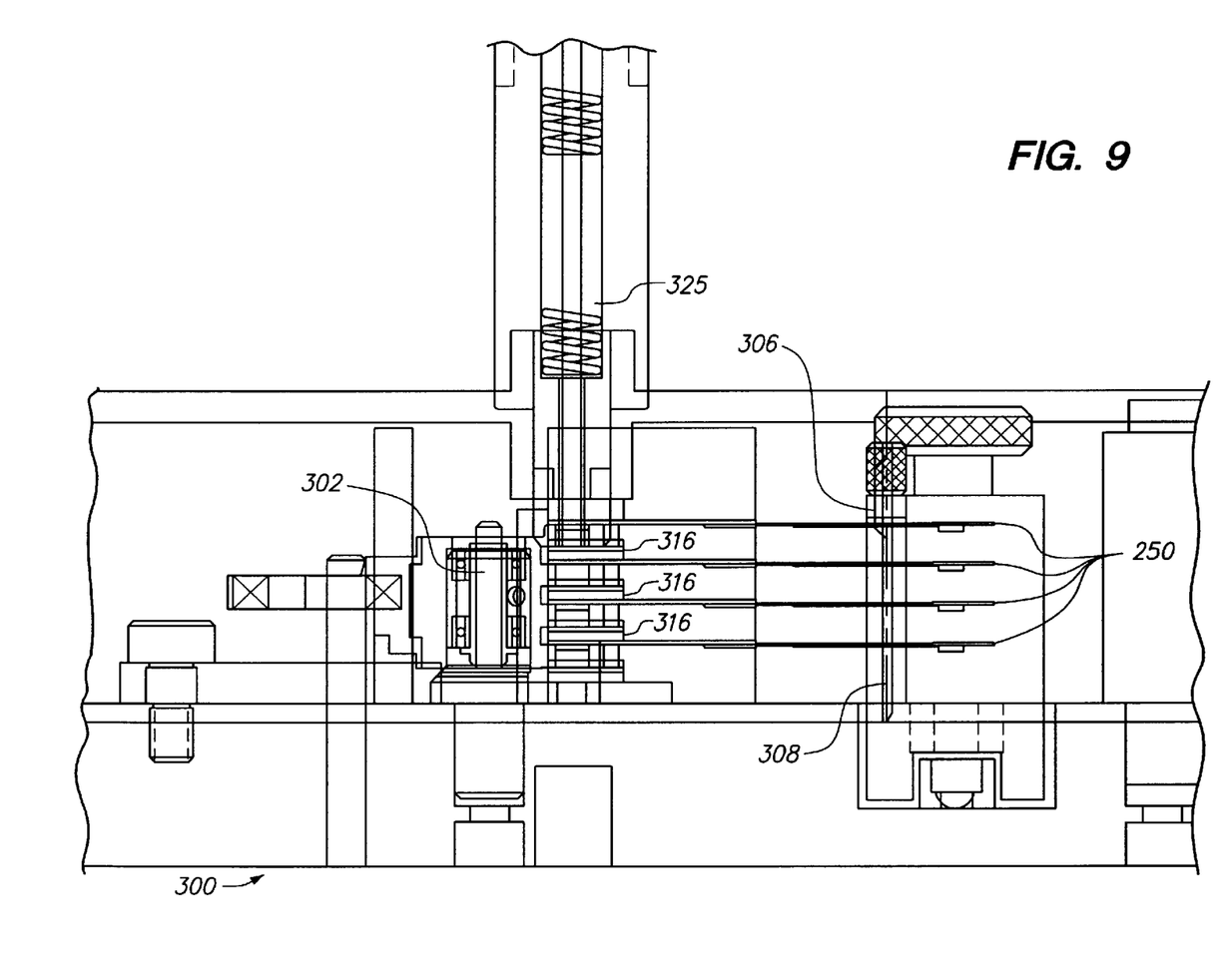
FIG. 9 is a diagrammatic plan view of a head stack assembly method comprising stacked head suspension assemblies and a head stack swaging fixture.
Figure 11:
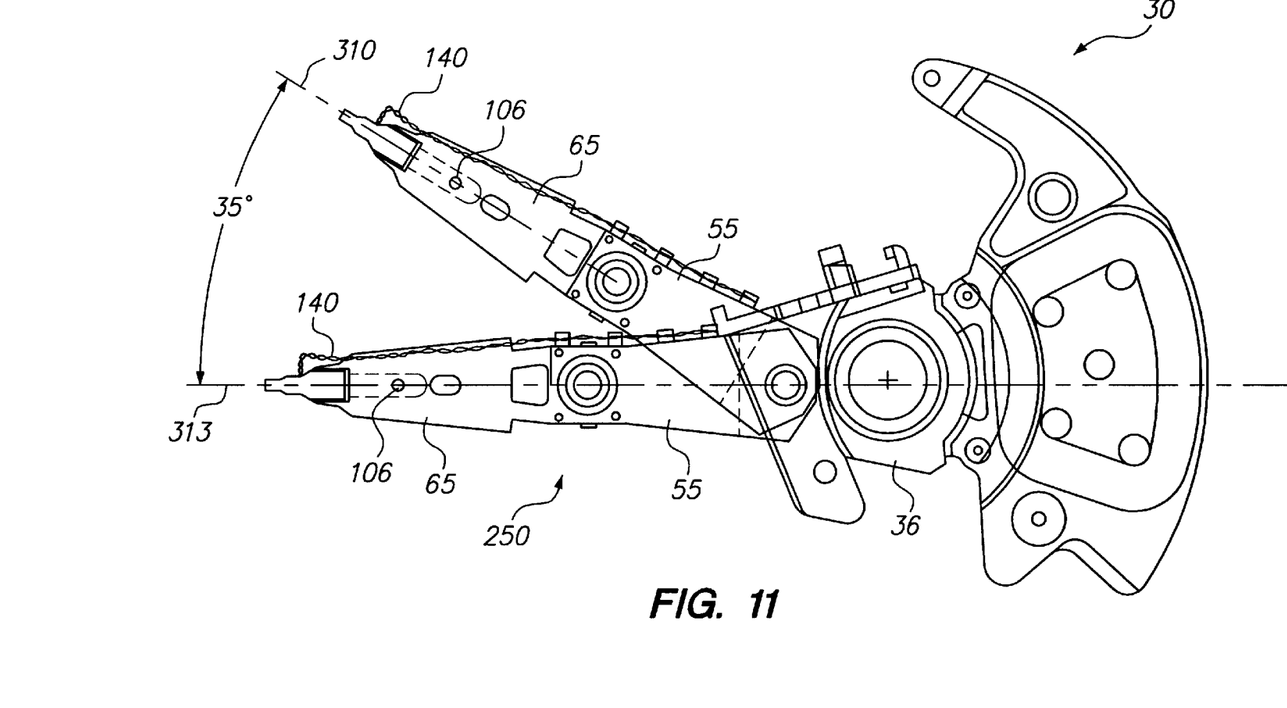
FIG. 11 is a diagrammatic top plan view of a head stack assembly during manufacture in accordance with the principles of the present invention.

With reference to FIGS. 9, 10 and 11, the method in which the head suspension assemblies 250 are preferably fastened to the E-block 36 will now be discussed (the details of assembly of the head suspension assembly 250 having already been described above). Preferably, all of the preassembled head suspension assemblies 250 having downwardly extending heads are fastened to the E-block first, as shown in FIG. 9. The reason all of the members 250 having downwardly facing heads are assembled first is to facilitate the swaging process. The first head suspension assembly 250 is placed on the bottom-most of the short tines 50 such that swage boss 74 on extender 55 fits into aperture 51 and the head 32 installed thereon is exposed in a downward direction. Spacers 316 are placed between members 250 and the short tines 50 of E-block 36 to maintain the head suspension assemblies 250 in place. As shown in FIG. 11, each head suspension assembly 250 is placed on the E-block 36 so that its central axis 310 is disposed at a displacement angle from the central axis 310 of the load beam suspension assembly 30, relative to a longitudinal axis 313 of the assembled head stack and actuator assembly 30.

Because one of the deflected edges 67 of extender 55 will press against the back wall (not shown) between two tines when the member is placed at an angle, the maximum loading angle is limited by the amount of angular deflection of edges 67. Assembly becomes easier when the loading angle is made larger. However, a larger loading angle requires that edges 67 have more deflection which will reduce the surface area of extender 55 resting on short tine 50, which will tend to decrease the integrity of the extender-tine connection. A deflection edge that facilitates a loading angle of about thirty-five degrees or less provides a suitable compromise between acceptable connection integrity of the load beam assembly 250 to the short tine 50 and ease of head stack assembly during the manufacturing process.

After each head suspension assembly 250 is placed on its associated short tine 50 at the loading angle, it is rotated toward the longitudinal axis 313 until the peg-leg load beam 65 enters an opening in a comb fixture 306. This step is repeated until the desired number of head suspension assemblies 250 are placed on the E-block 36. The desired number will generally depend on the number of storage disks 26 and active storage surfaces that will be provided in the assembled hard disk drive 10.

After the desired number of head suspension assemblies 250 are placed on E-block 36, an alignment pin 308 is inserted through the alignment openings 106 of each peg-leg load beam 65 of the head stack. Positioning pin 308 is in fixed relationship to an actuator temporary mounting post 302 such that its insertion through opening 106 will precisely position the head suspension assemblies 250 about a central longitudinal axis 313 of the voice coil actuator 30. After placing head suspension assemblies 250 in their proper position, the assemblies 250 are fastened to the E-block 36 by a conventional ball swager 325 in which an oversized ball or pin is forced under pressure to pass progressively through the apertures 51 in the short tines 50, thereby expanding each swage boss 74 into the E-block 36.

After the head suspension assemblies 250 having down-facing heads 32 are fastened to the E-block 36. the E-block 36 is removed from the mounting post 302, turned over, and re-placed on the temporary mounting post 302. Then, the above-described method of fastening the head suspension assemblies 250 to the E-block 36 is repeated.

Note that the voice coil actuator assembly 30 may be assembled by first placing the head suspension assemblies 250 with up-facing heads onto the short tines 50 of E-block 36. The assembly methodology is the same except that the swager 325 must be located on the bottom of the head stack assembly fixture 300. This is because the ball or pin of conventional swager 325 must first travel in the direction that each swage boss 74 is facing relative to its associated aperture 51.

Thus, an improved rotary voice coil actuator assembly and method of assembling same is disclosed. Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A high capacity miniature fixed disk drive comprising:

a housing defining a floor and contiguous side walls;

a cover that mates with contiguous side walls;

a disk spindle extending from said floor, said disk spindle including an in hub direct drive DC spindle motor, at least one data storage disk mounted on said disk spindle and rotated by the spindle motor;

a rotary voice coil actuator assembly mounted to said floor and including an E-block having at least one short tine substantially coplanar with the data storage disk and located outside of the periphery thereof, the at least one short tine defining a planar surface;

at least one head suspension assembly attached to the at least one short tine by swaging of a swage boss thereof into an opening defined on the planar surface of the short tine and supporting a data transducer head assembly in flying proximity to a data storage surface of the rotating data storage disk, the data transducer head assembly being affixed to a head gimbal portion of the head suspension assembly at a distal end thereof and facing away from the head suspension assembly in the same direction as the swage boss;

the head suspension assembly including a rigid and substantially flat elongated tine extender extending outwardly from the head suspension assembly at a tine attachment end of the elongated tine extender, the tine attachment end comprising the swage boss, the load beam adapted to provide a preload force to the data transducer head assembly toward the data storage surface;

the E-block and head suspension assembly forming an inline rotary voice coil actuator assembly along a single longitudinal axis of substantial symmetry;

at least two disks mounted in spaced-apart relationship on said disk spindle, at least two short tines, each being substantially coplanar with an associated one of the at least two disks, at least four head suspension assemblies comprising:

at least four rigid and substantially flat tine extenders, each of said at least four rigid tine extenders being attached to one of said at least two short tines in substantial in-line alignment therewith along a longitudinal axis, each of said four extenders formed to define:

a proximal attachment region having a swage boss adapted to be affixed to a corresponding aperture formed in each of said at least two short tines;

a distal attachment region having a mating hole;

at least four peg-leg beams, each of said at least four peg-leg beams being attached to one of said at least four tine extenders in substantial in-line alignment therewith along said longitudinal axis, each of said at least four peg-leg beams formed to define:

a curvilinear portion extending from one end of each peg-leg beam, said curvilinear portion being further defined by a curved edge and a substantially straight edge and includes at least two marginal tabs defined along said substantially straight edge, said at least two marginal tabs adapted to extend outwardly when said at least four peg-leg load beams are affixed to said at least four extenders;

a fastening portion having a circular hole adapted to correspond to said mating hole when said at least four peg-leg load beams are affixed to said at least four extenders;

a leaf spring portion adjacent said fastening portion;

a central portion extending from said leaf spring portion having U-shaped flanges formed integrally;

a head extension portion adapted to receive a gimbal;

at least four head sliders, each of said head sliders being affixed to said gimbal on said head extension portion of said at least four peg-leg load beams; and at least four conductive wire sets connected to electrical contact on data head transducers formed on said he a d sliders and dressed along one of said U-shaped flanges and bonded by a bonding agent to said at least two marginal tabs, each of said wires of said four conductive wire sets comprising tubeless insulated. small gauge twisted-wire pairs.

2. The high capacity miniature fixed disk drive of claim 1 wherein said tine attachment end of said elongated tine extender further comprises a first deflected edge and a second deflected edge.

3. The high capacity miniature fixed disk drive of claim 1 wherein said proximal attachment region of each of said four extenders further comprises a first deflected edge and a second deflected edge.

* * * * *